US010857546B2

(12) United States Patent
Looft

(10) Patent No.: US 10,857,546 B2
(45) Date of Patent: Dec. 8, 2020

(54) APPARATUS FOR CONVEYING AND PROCESSING FOODSTUFFS AND RELATED METHOD OF OPERATION

(71) Applicant: VEMAG Maschinenbau GmbH, Verden (DE)

(72) Inventor: Michael Looft, Achim (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 183 days.

(21) Appl. No.: 16/128,157

(22) Filed: Sep. 11, 2018

(65) Prior Publication Data

US 2019/0076850 A1 Mar. 14, 2019

(30) Foreign Application Priority Data

Sep. 13, 2017 (DE) .................... 20 2017 105 549 U

(51) Int. Cl.
*B02C 25/00* (2006.01)
*B02C 18/22* (2006.01)
(Continued)

(52) U.S. Cl.
CPC .......... *B02C 25/00* (2013.01); *A22C 17/0026* (2013.01); *B02C 18/22* (2013.01);
(Continued)

(58) Field of Classification Search
CPC ......... B02C 25/00; B02C 23/04; B02C 18/30; B02C 18/305; A22C 17/0026
See application file for complete search history.

(56) References Cited

U.S. PATENT DOCUMENTS

2002/0084368 A1 7/2002 Bernhardt et al.

FOREIGN PATENT DOCUMENTS

DE 9205906 U1 7/1992
DE 29818980 U1 1/1999
(Continued)

OTHER PUBLICATIONS

Gill Sensors & Controls, 5 Reasons to Choose Induction Over Hall Effect Sensors, https://www.gillsc.com/newsitem/45/5-reasons-choose-induction-over-hall-effect-sensors (Year: 2017).*
(Continued)

*Primary Examiner* — Matthew Katcoff
(74) *Attorney, Agent, or Firm* — Wood Herron & Evans LLP

(57) ABSTRACT

A conveyor apparatus for conveying and processing foodstuffs such as meat is provided. The conveyor apparatus includes a filling device, a mincer which can be coupled to the filling device and having an inlet and an outlet, a closure element which can be mounted to the outlet, a signaling device associated with the closure element, and at least one signal line device for the transmission of signals of the signaling device from the closure element to the filling device. The provision of the signaling device and the signal line device allows for prevention of operation of the cutting elements of the mincer when the closure element is not detected to be in a closed position, thereby making maintenance and repair safer to conduct. A method of conveying foodstuffs in accordance with the apparatus is also provided.

18 Claims, 3 Drawing Sheets

(51) Int. Cl.
    *B02C 23/04*          (2006.01)
    *B02C 18/30*          (2006.01)
    *A22C 17/00*          (2006.01)
    *B02C 23/02*          (2006.01)

(52) U.S. Cl.
    CPC ........ *B02C 18/2266* (2013.01); *B02C 18/302* (2013.01); *B02C 18/305* (2013.01); *B02C 23/02* (2013.01); *B02C 23/04* (2013.01)

(56) References Cited

FOREIGN PATENT DOCUMENTS

| | | |
|---|---|---|
| DE | 10054028 A1 | 5/2002 |
| DE | 102015114891 A1 | 3/2017 |
| EP | 1832346 A2 | 9/2007 |

OTHER PUBLICATIONS

European Patent Office, Extended Search Report dated Dec. 21, 2018, 5 pages.

\* cited by examiner

APPARATUS FOR CONVEYING AND PROCESSING FOODSTUFFS AND RELATED METHOD OF OPERATION

CROSS-REFERENCE TO RELATED APPLICATION

This application claims priority to German Application No. 20 2017 105 549.3, filed Sep. 13, 2017. The above-mentioned patent application is incorporated herein by reference in its entirety.

TECHNICAL FIELD

The invention relates to an apparatus for conveying and processing foodstuffs, in particular meat. The invention further relates to a method of conveying and processing foodstuffs using the apparatus.

BACKGROUND

For the production of foodstuffs, in particular meat of a fine consistency, various starting substances usually have to be mixed, blended and if necessary chopped up. That is performed by apparatuses of the kind described herein. In such apparatuses, the various starting substances like for example meat products and other ingredients are introduced into a filling hopper associated with a filling device and often also referred to as the filling machine. Within such a filling device the individual ingredients are thoroughly mixed, and a conveyor apparatus like for example a worm drive conveys the mixed ingredients to a mincer connected to the apparatus.

Such a mincer can carry out different functions and tasks like for example cutting, dividing up or filling. Therefore, depending on the respective task and characteristic such a mincer is also referred to as a filling mincer, a dividing mincer or also a cutting mincer. Such a mincer typically contains cutting elements which grind up supplied material and discharge it through an opening arranged at the outlet of the mincer and defining the outlet. The opening can be delimited for example by a closure element. The cutting elements are driven in per se known manner by drive means which transmit a torque to the cutting elements for example by way of a drive shaft. That drive torque causes the cutting elements to rotate, and that performs a chopping operation.

Particularly when processing meat particles of different kind and size inevitably become stuck during operation in the interior of the mincer, in particular in the region of the cutting elements. Those particles can comprise for example fat, meat, cartilage or bone. To achieve a constant discharge of chopped material and to avoid damage to the apparatus it is necessary for those particles to be removed from the interior of the mincer from time to time. In the case of mincers known in the state of the art therefore it is necessary to remove the apertured plate disposed at the outlet of the mincer and then to withdraw the cutting elements from the mincer with a withdrawal tool.

One problem with the apparatus known in the state of the art is that, when the mincer is opened, there is the risk that the apparatus is set in operation while an operator is carrying out the task of removing the cutting elements. It is evident that this entails a serious risk of injury. It would be desirable, therefore, to develop an apparatus such that the disadvantages encountered in the state of the art are eliminated as far as possible, and in particular, to provide an apparatus which as much as possible reduces the risk of injury during maintenance of the mincer.

SUMMARY

According to one embodiment of the invention, these technical objectives are achieved by providing an apparatus of the above described type with a signaling device associated with the closure element and at least one signal line device for the transmission of signals of the signaling device from the closure element to the filling device. That combination of signaling device and signal line device affords the advantage that it is possible reliably to detect that the closure element, which in turn ensures that the cutting elements are protected from access from the exterior is arranged on the mincer or the housing thereof. Accordingly, it is possible to prevent operation of the cutting elements being initiated by mistake upon maintenance of the mincer, when the closure element is removed from the mincer housing. In addition, the arrangement of the signaling device and the signal line device affords the advantage that no sensors must be arranged at the closure element and thus no cables and the like have to be disposed on the mincer housing. It has further been found that maintenance staff sometimes make some effort to manipulate sensors to reduce the amount of time required for maintenance, to the detriment of safety. Such an arrangement of signaling device and signal line device according to the invention further affords the advantage in this context that it is less easy to manipulate, and that also has a positive effect on operational safety.

In one aspect, the signaling device has at least one permanent and/or non-permanent magnet. The use of a magnetic signal moreover represents a particularly simple and inexpensive possible way of signaling and at the same time affords a possibility which overall is less easy to manipulate. Thus, manipulation for example of a simple push switch is markedly easier to do than such a magnetic switch which moreover can be unobtrusively positioned in the housing so that the precise position of the magnetic signaling device cannot be readily identified by an operator or by the maintenance personnel.

In another aspect, the signal line device is designed and adapted to pass a magnetic field from the signaling device to the filling device. The advantages already referred to above also similarly apply at this point, in particular, such a signal conductor for conducting magnetic fields can be particularly unobtrusively arranged in a mincer or in the related housing. The arrangement of such a signal conductor is also overall inexpensive and can be implemented in the context of retro-fitting to existing mincers.

In yet another aspect, the signal line device for transmission of the magnetic field has at least one of the following: ferrite, pure iron, and electrical plate, in particular an electrical plate pack. The described materials and arrangements are highly suited to very substantially loss-free transmission of a magnetic field, they are in that respect easy to process, they are inexpensive, and they can be flexibly used.

In some embodiments, the signal line device is in the form of a substantially bar-shaped element. Such an arrangement permits a related signal to be reliably transmitted and in addition requires only a limited amount of structural space.

For example, the bar-shaped element in addition has a curvature. It is possible in that way to provide a non-aligned arrangement of the signaling device and a related sensor, whereby such a signal line device can be adapted to existing constructions while at the same time providing for suitability for retro-fitting to existing mincers.

In a further aspect, the bar-shaped element is arranged in a housing body of the mincer. In that way the bar-shaped element is shielded off outwardly and is not visible to the operator and the maintenance staff, which makes it difficult to implement procedures for by-passing a safety shut-off arrangement triggered by the signal.

It is preferably provided that the filling device has a sensor for sensing the signals transmitted by the signal line device. In that respect positioning of the sensor can be performed for the purpose that it can overall be manipulated only with difficulty and the positioning can also take account of structural aspects and limitations on the filling device and the mincer.

According to a preferred embodiment the sensor is in the form of an inductive sensor. Detection of magnetic fields is inexpensively possible in that way and manipulation of such a sensor requires some effort and cannot be readily performed.

In another embodiment according to the invention, a method includes at least the steps: generating a signal at a closure element of the mincer by a signaling device; transmitting the signal from the signaling device to the conveyor apparatus by a signal line device; and sensing the signal at the conveyor apparatus. The advantages already discussed hereinbefore are included here and apply in a similar fashion. To sum up the method permits monitoring of the position or the presence of a closure element on a mincer in a simple and inexpensive fashion, while at the same time manipulation of such detection by an operator or by maintenance personnel is made more difficult.

The method may further comprise the step of stopping the mincer when no signal is sensed at the filling device. In that way the mincer is reliably and directly stopped when it is detected that the closure element is no longer on the mincer. Furthermore, the method affords the advantage that, in the event of a fault, for example due to failure of the signaling device or the sensor, only the apparatus overall is stopped. Failure of signaling device, sensor or signal conductor cannot therefore have the result that the cutting elements of a mincer are activated by error although the closure element is possibly no longer present. That additionally contributes to enhancing safety.

In one aspect, the signal is a magnetic signal, in particular a magnetic field. In regard to advantages which are entailed with the use of a magnetic signal attention is directed to the foregoing description.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitutes a part of this specification, illustrate one or more embodiments of the invention and, together with the general description given above and the detailed description given below, explain the one or more embodiments of the invention.

DETAILED DESCRIPTION

Figure 1:
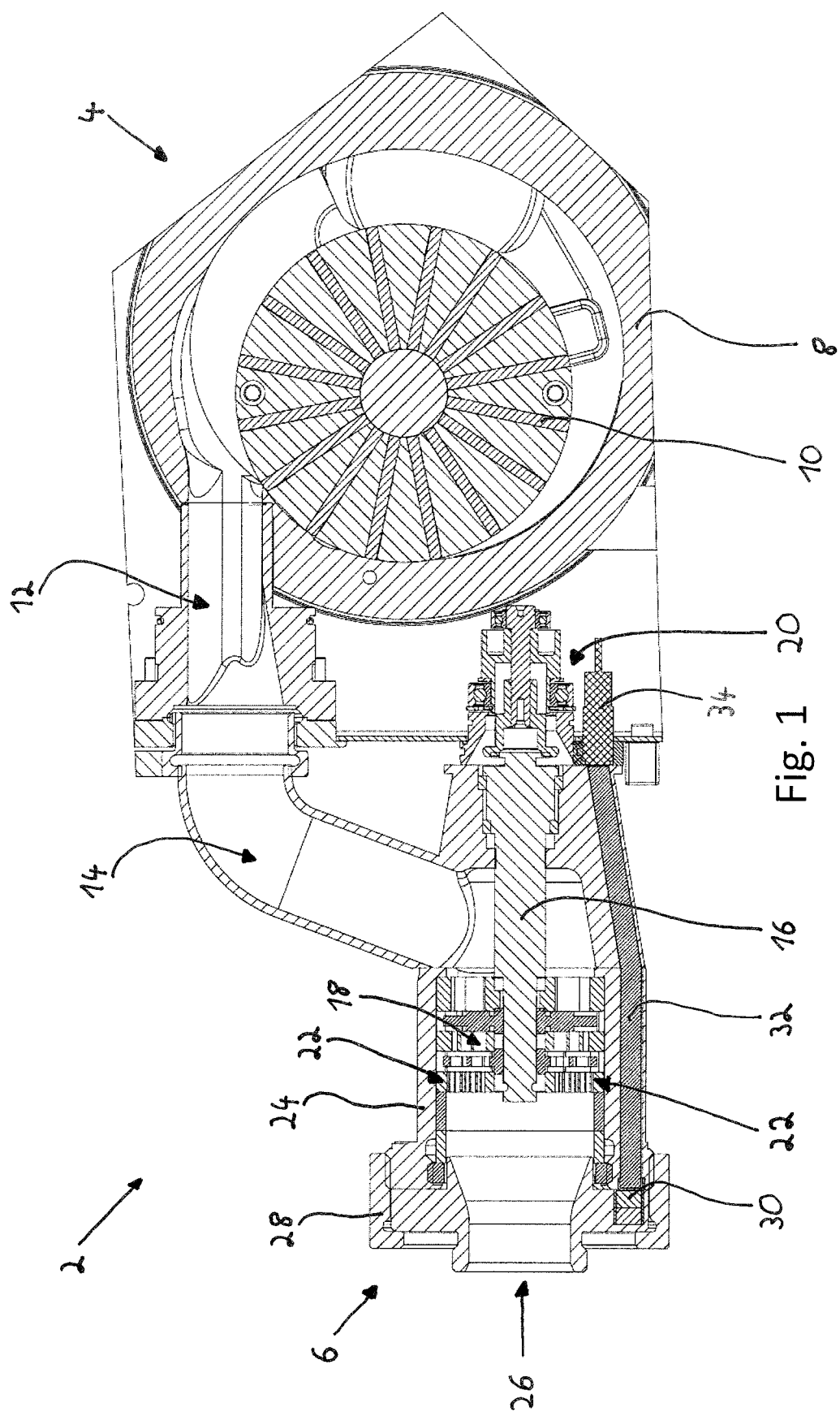
FIG. 1 shows a top sectional view of a first embodiment of an apparatus according to the invention for conveying and processing foodstuffs.

FIG. 1 shows a conveyor apparatus 2 having a filling device 4 and a mincer 6. The filling device 4 has a hopper 8 into which various starting substances like for example meat products can be introduced. Mixing of the individual starting substances is performed by a conveyor element 10 which conveys the starting substances further in the direction of the outlet 12. The filling device 4 is connected in material-conducting relationship to the mincer 6 by a connecting tube 14.

The mincer 6 has a housing 24 which is closed at its outlet end 26 by a closure element 28. Arranged in the mincer housing 24 is a blade shaft 16 which is supported and driven by a blade shaft bearing 18 and a blade shaft bearing and drive portion 20. Cutting arrays 22 are further arranged on the blade shaft 16. A mixture of in particular meat products passes from the connecting tube 14 into the mincer 6 and is chopped up and portioned in particular in the region of the cutting arrays 22. It finally leaves the mincer 6 by way of the mincer outlet 26.

The closure element 28 also ensures that the rotating parts of the cutting arrays 22 are protected from access from the exterior. Magnets 30 are arranged in the closure element 28 to detect the position thereof. The magnets 30 create a magnetic field which is transmitted substantially loss-free by the signal conductor 32 in the direction of the filling device 4. A sensor 34 is arranged in the filling device 4 immediately adjacent to the signal conductor 32. That sensor 34 is in the present case an inductive sensor adapted to detect the presence of a magnetic field. When the closure element 28 is connected to the housing 24 of the mincer 6 the magnetic signal or the magnetic field is transmitted from the magnet 30 to the sensor 34 by the signal conductor 32.

When therefore the sensor 34 detects the presence of a magnetic field then the closure element 28 is disposed on the mincer housing 24 and the conveyor apparatus 2 can be operated without danger. If, however, the closure element 28 is removed from the mincer housing 24 then in principle there is a risk of injury to maintenance personnel, in particular due to rotating elements of the cutting arrays 22. When the closure element 28 is removed from the mincer housing 24 then in that case the magnets 30 arranged in the closure element 28 no longer adjoin the signal conductor 32. In that case the signal conductor 32 no longer passes a magnetic field in the direction of the sensor 34. In such a situation the sensor 34 would no longer detect the presence of a magnetic field and the conveyor apparatus 2 would be stopped.

Figure 2:
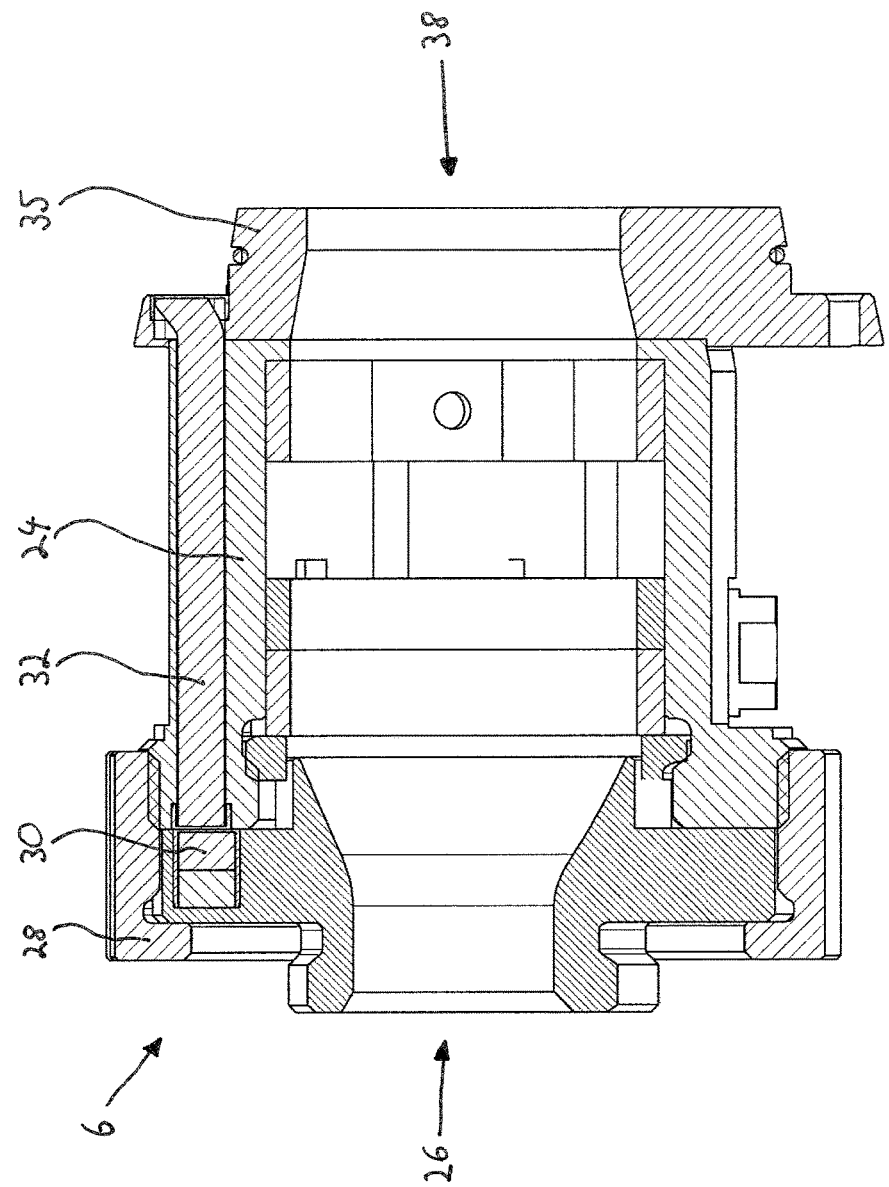
FIG. 2 shows a top sectional view of a signalling device and a signal line device, arranged in a housing of a mincer, used with the apparatus of FIG. 1.

An alternative embodiment of a mincer 6 is shown in FIG. 2. The mincer 6 in per se known manner has a housing 24 and a closure element 28. Magnets 30 are arranged in the closure element 28 or adjacent thereto. The magnetic field of the magnets is transmitted by a signal conductor 32. A sensor is not shown in FIG. 2. The mincer 6 can be coupled by the connecting portion 35 to a conveyor apparatus or filling device (also not shown).

Figure 3:
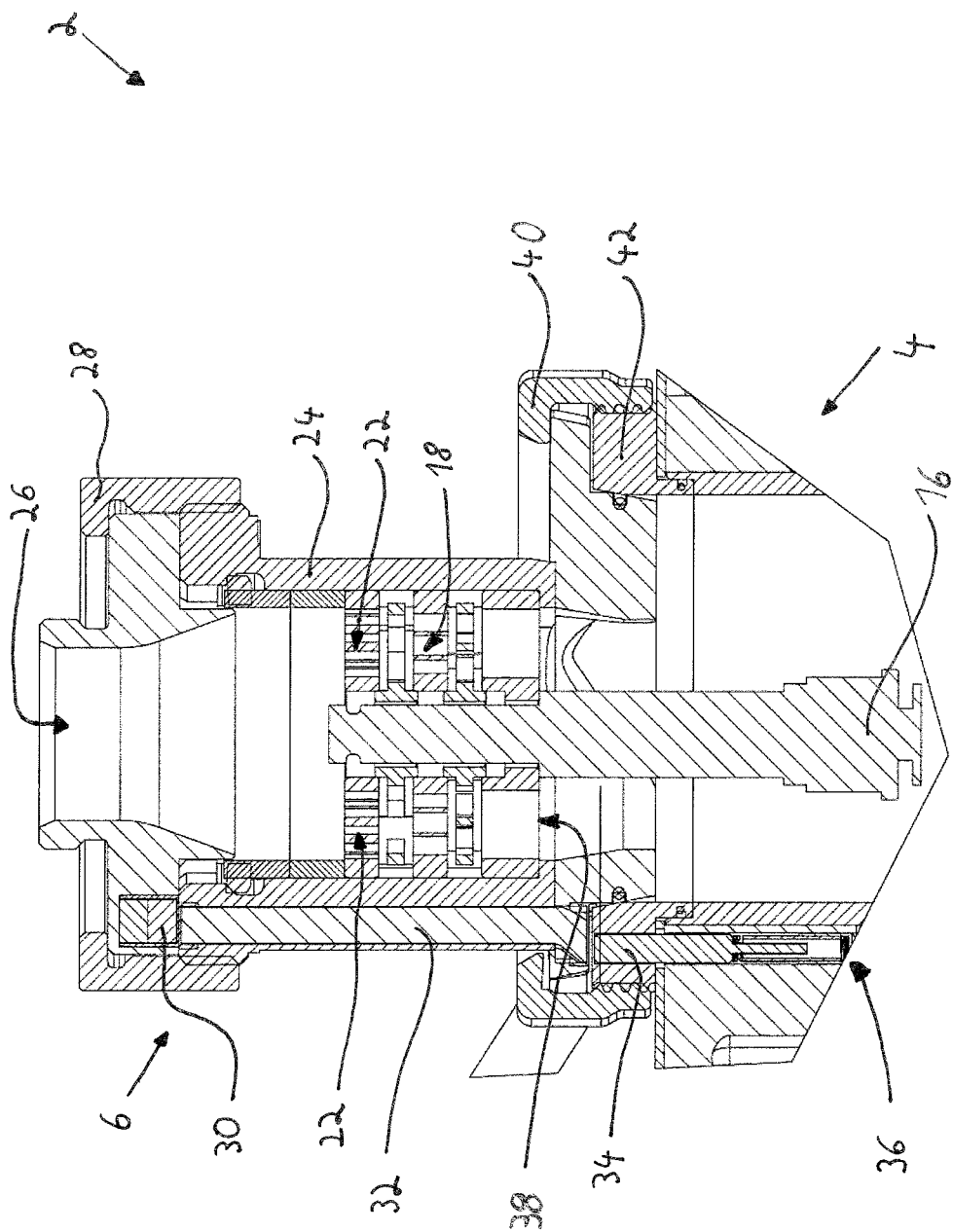
FIG. 3 shows the mincer of FIG. 2 with the signaling device and a signal line device, with the mincer being arranged at a filling device.

The mincer 6 according to the invention as shown in FIG. 2 is also illustrated in FIG. 3, arranged on a filling device 4. The mincer 6 has a housing 24 and a closure element 28. The mincer 6 can be coupled to a thread portion 42 of the filling device 4 by the flange portion 40. The mincer 6 has a blade shaft 16 on which cutting arrays 22 are arranged. The blade shaft 16 is supported at least at one end by the blade shaft bearing 18. Material to be minced passes by way of the mincer inlet 38 from a filling device 4 into the mincer 6, is chopped up by the cutting arrays 22 and finally leaves the mincer 6 by way of the outlet 26. Magnets 30 are arranged in the closure element 28 or adjacent thereto to detect the state of the closure element 28. The magnetic field of the magnets 30 is transmitted in known manner by the signal conductor 32 to the sensor 34. In the present case the sensor 34 has sensor connections 36. In regard to transmission of the magnetic field from the magnets 30 to the sensor 34 by the signal conductor 32 attention is directed to the description relating to FIG. 1, which similarly applies in the present case.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

LIST OF REFERENCES 2 conveyor apparatus
4 filling device
6 mincer
8 hopper
10 conveyor element
12 outlet
14 connecting tube
16 blade shaft
18 blade shaft bearing
20 blade shaft bearing and drive portion
22 cutting array
24 mincer housing
26 mincer outlet
28 closure element
30 magnets
32 signal conductor
34 sensor
35 connecting portion
36 sensor connection
38 mincer inlet
40 flange portion
42 thread portion

What is claimed is:

1. A conveyor apparatus for conveying and processing foodstuffs such as meat, comprising:
    a filling device,
    a mincer which is coupled to the filling device and having an inlet and an outlet,
    a closure element which is mounted to the outlet,
    a signaling device included and arranged in the closure element, the signaling device generating signals indicating whether the closure element is mounted to the outlet of the mincer, and
    at least one signal line device for a transmission of the signals of the signaling device from the closure element to the filling device.

2. The conveyor apparatus of claim 1, wherein the signaling device includes at least one of a permanent magnet and a non-permanent magnet.

3. The conveyor apparatus of claim 2, wherein the signal line device includes a substantially bar-shaped element.

4. The conveyor apparatus of claim 3, wherein the bar-shaped element has a curvature.

5. The conveyor apparatus of claim 3, wherein the bar-shaped element is disposed in a housing body of the mincer.

6. The conveyor apparatus of claim 3, wherein the filling device has a sensor for sensing the signals transmitted by the signal line device.

7. The conveyor apparatus of claim 6, wherein the sensor includes an inductive sensor.

8. The conveyor apparatus of claim 1, wherein the signal line device is designed and adapted to pass a magnetic field from the signaling device to the filling device.

9. The conveyor apparatus of claim 8, wherein the signal line device for transmission of the magnetic field has at least one of the following:
    ferrite,
    pure iron, and
    an electrical plate pack.

10. The conveyor apparatus of claim 8, wherein the signal line device includes a substantially bar-shaped element.

11. The conveyor apparatus of claim 10, wherein the bar-shaped element has a curvature.

12. The conveyor apparatus of claim 10, wherein the bar-shaped element is disposed in a housing body of the mincer.

13. The conveyor apparatus of claim 1, wherein the filling device has a sensor for sensing the signals transmitted by the signal line device.

14. The conveyor apparatus of claim 13, wherein the sensor includes an inductive sensor.

15. A method of operating a conveyor apparatus comprising a filling device and a mincer, the method comprising:
    generating a signal at a closure element of the mincer by a signaling device included and arranged in the closure element, the signal indicating whether the closure element is connected to the mincer;
    transmitting the signal from the signaling device to the conveyor apparatus by a signal line device; and
    sensing the signal at the conveyor apparatus.

16. The method of claim 15 and further comprising:
    stopping the mincer when no signal is sensed at the filling device.

17. The method of claim 16, wherein the signal is a magnetic field.

18. A method of operating a conveyor apparatus comprising a filling device and a mincer, the method comprising:
    generating a signal at a closure element of the mincer by a signaling device;
    transmitting the signal from the signaling device to the conveyor apparatus by a signal line device; and
    sensing the signal at the conveyor apparatus,
    wherein the signal is a magnetic field.

* * * * *